United States Patent
Dong et al.

(10) Patent No.: US 11,422,723 B2
(45) Date of Patent: Aug. 23, 2022

(54) MULTI-STORAGE DEVICE LIFECYCLE MANAGEMENT SYSTEM

(71) Applicant: Dell Products L.P., Round Rock, TX (US)

(72) Inventors: Wei Dong, Shanghai (CN); Haifang Zhai, Shanghai (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/944,837

(22) Filed: Jul. 31, 2020

(65) Prior Publication Data

US 2021/0405906 A1 Dec. 30, 2021

(30) Foreign Application Priority Data

Jun. 29, 2020 (CN) .......................... 202010608005.8

(51) Int. Cl.
  *G06F 3/06* (2006.01)
(52) U.S. Cl.
  CPC .......... *G06F 3/0635* (2013.01); *G06F 3/0616* (2013.01); *G06F 3/0683* (2013.01)
(58) Field of Classification Search
  CPC .... G06F 3/0635; G06F 3/0611; G06F 3/0659; G06F 3/0683–0689; G06F 2212/7211; G06F 3/0616
  See application file for complete search history.

(56) References Cited

U.S. PATENT DOCUMENTS

| | | | | |
|---|---|---|---|---|
| 2010/0005228 A1* | 1/2010 | Fukutomi | ............. | G06F 11/108 711/103 |
| 2015/0339159 A1* | 11/2015 | Gupta | .................... | G06F 9/50 718/105 |
| 2016/0306557 A1* | 10/2016 | Koseki | ................. | G06F 3/0659 |
| 2017/0315753 A1* | 11/2017 | Blount | ................. | G06F 3/0649 |
| 2017/0359261 A1* | 12/2017 | Avci | ...................... | H04L 47/127 |
| 2018/0032268 A1* | 2/2018 | Barndt | ................. | G06F 3/0616 |
| 2020/0004671 A1* | 1/2020 | Neufeld | ............... | G06F 3/0644 |

* cited by examiner

*Primary Examiner* — Chie Yew
(74) *Attorney, Agent, or Firm* — Joseph Mencher (57) ABSTRACT

A multi-storage device lifecycle management system includes a server computing system having a plurality of devices and an operating system engine. The operating system engine identifies an estimated first device remaining lifetime for a first device, identifies an estimated second device remaining lifetime for a second device, and determines whether a difference between the estimated first device remaining lifetime and the estimated second device remaining lifetime is less than an estimated multi-device minimum end-of-lifetime difference. If so, the computing system distributes workload operations between the first device and the second device in order to cause the difference between the estimated first device remaining lifetime and the estimated second device remaining lifetime to be greater than or equal to the estimated multi-device minimum end-of-lifetime difference.

20 Claims, 8 Drawing Sheets

MULTI-STORAGE DEVICE LIFECYCLE MANAGEMENT SYSTEM

BACKGROUND

This application claims priority to Chinese Patent Application Serial No. 202010608005.8, filed Jun. 29, 2020, the disclosure of which is incorporated herein by reference in its entirety.

The present disclosure relates generally to information handling systems, and more particularly to managing the lifecycle of multiple storage devices utilized in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometimes utilize a storage system having multiple storage devices. For example, server computing devices may include a storage system with multiple storage devices that are coupled to a backplane in the server computing device and that may be provided by, for example, Solid State Drives (SSDs). Furthermore, erasure coding techniques may be utilized with those storage devices in order to protect data stored on those storage devices. As would be understood by one of skill in the art in possession of the present disclosure, erasure coding is a data protection technique in which data is broken up into fragments, expanded and encoded with redundant data pieces, and stored across the different storage devices in the server computing device. Erasure coding enables data that becomes corrupted or otherwise unavailable (e.g., due to a corrupted, failed, or otherwise unavailable storage device) to be rebuilt using information about that data that is stored on the storage devices (e.g., the storage devices that have not failed, become corrupted, or are otherwise unavailable). However, traditional storage system/erasure coding implementations can lead to some issues.

For example, in conventional storage systems utilizing erasure coding, workloads performed using the storage system (e.g., data writes) are balanced across the storage devices in the storage system, and in the event of a failure of a storage device in the storage system, that failed storage device is identified and replaced with a replacement storage device, with the data that was stored on the failed storage device being rebuilt on the replacement storage device based on the erasure coding techniques discussed above. However, in some situations the time needed to identify and replace failed storage devices can be relatively significant and, as storage device capacity increases, the time needed to reconstruct data on a replacement storage device can be significant as well. For example, approximately one day is required to reconstruct data on current Peripheral Component Interconnect express (PCIe) Generation 3 (Gena)×4 32 terabyte SSDs. As such, the identifying, replacing, and rebuilding of data as a result of a single failed storage device will result in a relatively significant "downtime" for at least a portion of the storage system (e.g., some storage devices in the storage system may enter a "read-only" mode in the event of such storage device failures, which limits storage system performance until the storage device failure is remedied).

The issues discussed above can be exacerbated in the event of multiple storage device failures. For example, the amount of time needed to identify, replace, and rebuild data in response to a failed storage device raises the possibility that one or more of the other storage devices in the storage system will fail before that process is completed. In order to address this possibility, conventional storage systems implement additional "erasure" storage devices that are capable of storing the information needed to rebuild data on multiple "primary" storage devices in the event of a multi-storage device failure, but such solutions increase costs and are still subject to the possibility of a failure of more "primary" storage devices than the "erasure" storage devices are capable of rebuilding data for.

Accordingly, it would be desirable to provide a multi-storage device erasure coding system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a device lifecycle management engine that is configured to: identify an estimated first device remaining lifetime for a first device; identify an estimated second device remaining lifetime for a second device; determine that a difference between the estimated first device remaining lifetime and the estimated second device remaining lifetime is less than an estimated multi-device minimum end-of-lifetime difference; and distribute, in response to determining that the difference between the estimated first device remaining lifetime and the estimated second device remaining lifetime is less than the estimated multi-device minimum end-of-lifetime difference, workload operations between the first device and the second device in order to cause the difference between the estimated first device remaining lifetime and the estimated second device remaining lifetime to be greater than or equal to the estimated multi-device minimum end-of-lifetime difference.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
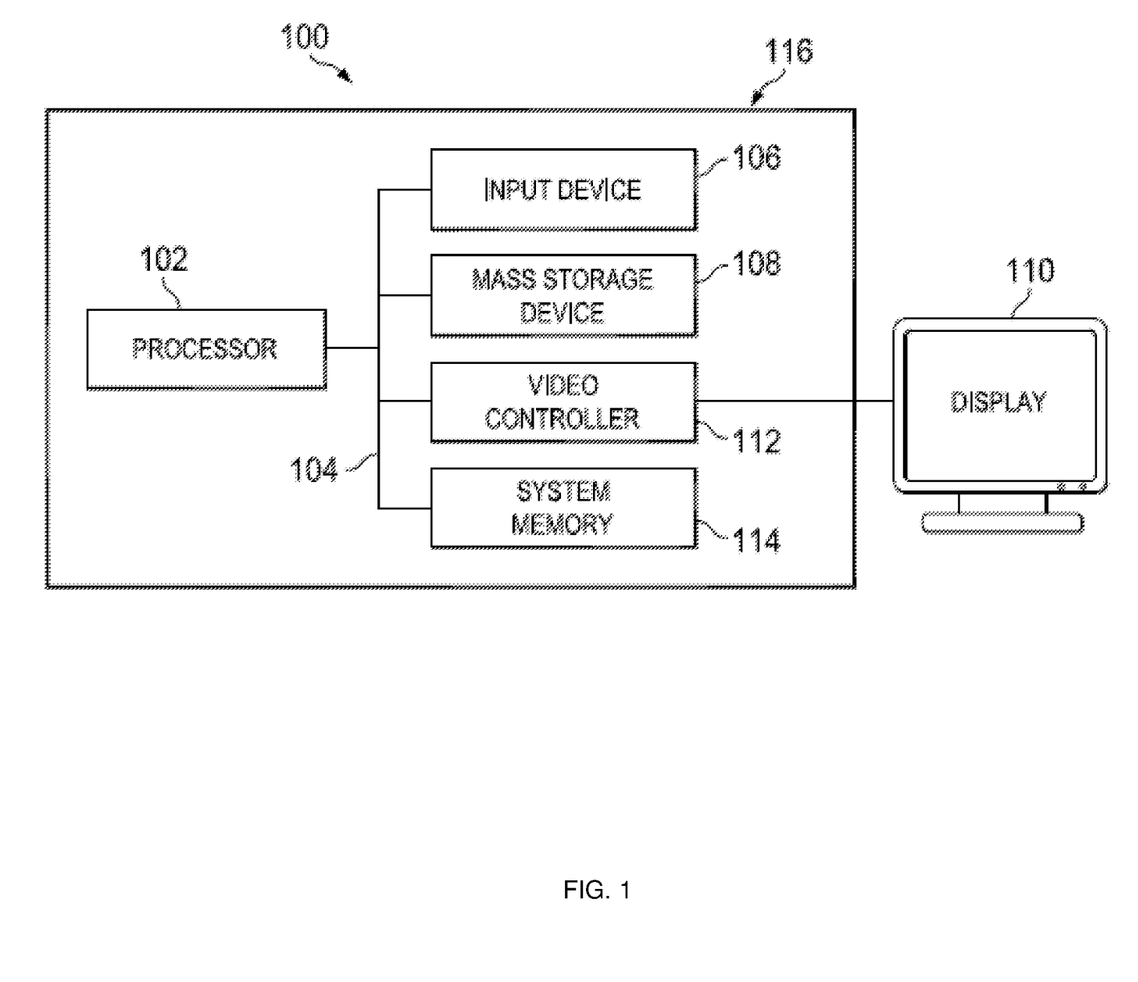
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
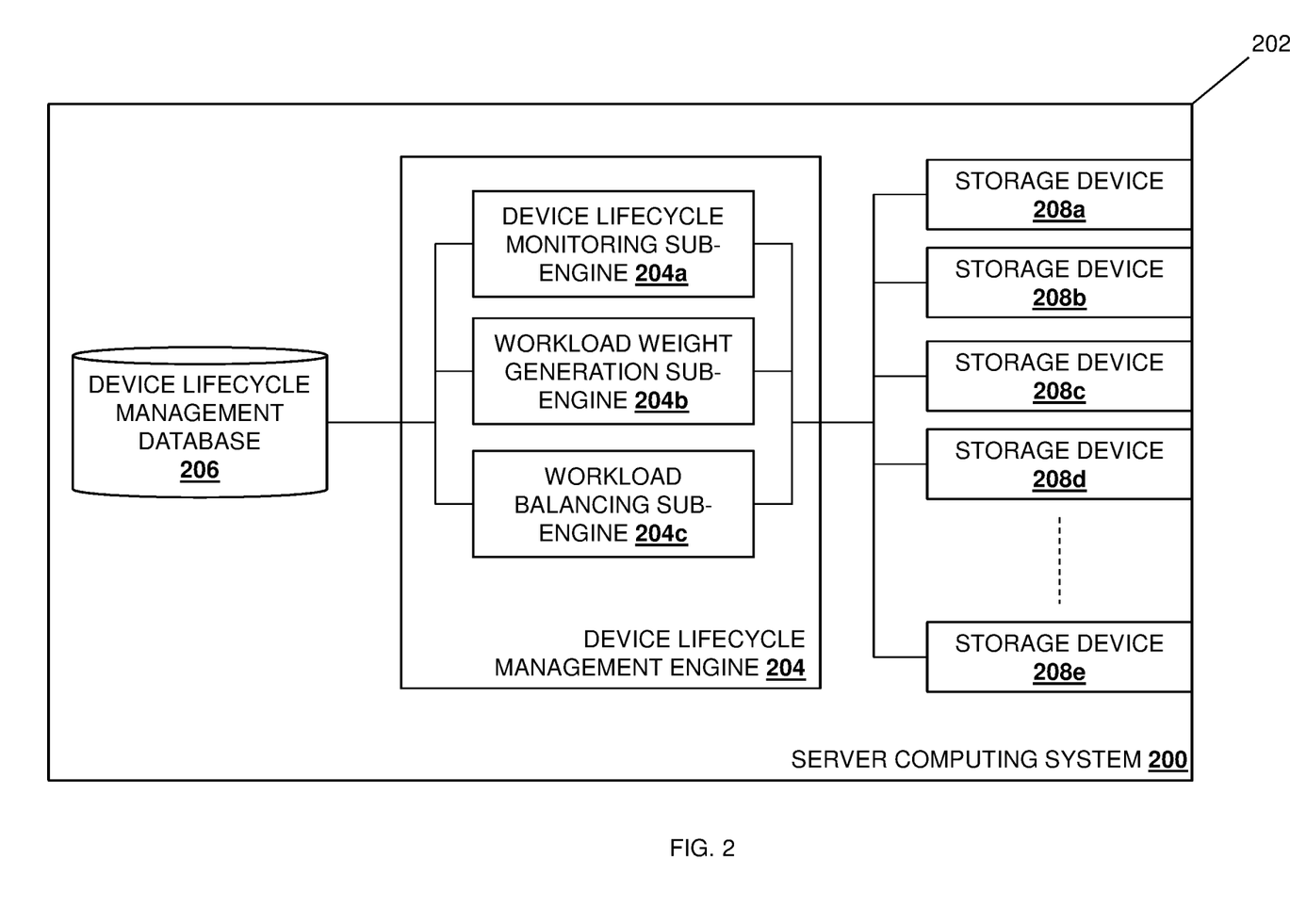
FIG. 2 is a schematic view illustrating an embodiment of a server computing system that may utilized the multi-storage device lifecycle management system of the present disclosure.

Referring now to FIG. 2, an embodiment of a server computing system 200 is illustrated that may utilize the multi-storage device lifecycle management system of the present disclosure. In an embodiment, the server computing system 200 may be provided by the IHS 100 discussed above with reference to FIG. 1 and/or may include some or all of the components of the IHS 100. Furthermore, while illustrated and discussed as being provided by a server computing system, one of skill in the art in possession of the present disclosure will recognize that the functionality of the server computing system 200 discussed below may be provided by other computing devices that are configured to operate similarly as the server computing system 200 discussed below. In the illustrated embodiment, the server computing system 200 includes a chassis 202 that houses the components of the server computing system 200, only some of which are illustrated below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a device lifecycle management engine 204 that is configured to perform the functionality of the device lifecycle management engines and/or server computing systems discussed below.

In a specific example, the device lifecycle management engine 204 of the present disclosure may be provided by an operating system engine that is configured to provide an operating system for the server computing system 200. As such, the memory system in the chassis 202 may include instructions that, when executed by the processing system in the chassis 202, cause the processing system to provide an operating system engine that is configured to perform the functionality of the device lifecycle management engines and/or server computing systems discussed below. Furthermore, in the embodiment illustrated in FIG. 2, the device lifecycle management engine 204 includes a device lifecycle monitoring sub-engine 204a that is configured to perform the functionality of the device lifecycle monitoring sub-engines and/or server computing systems discussed below, a workload weight generation sub-engine 204b that is configured to perform the functionality of the workload weight generation sub-engines and/or server computing systems discussed below, and a workload balancing sub-engine 204c that is configured to perform the functionality of the workload balancing sub-engines and/or server computing systems discussed below. However, while specific sub-engines performing specific functionality are described below, one of skill in the art in possession of the present disclosure will recognize that a variety of device lifecycle management engines and sub-engines may perform a variety of conventional functionality (e.g., operating system functionality) and/or the functionality discussed below while remaining within the scope of the present disclosure as well.

The chassis 202 may also house a storage system (not illustrated, but which may include the storage 108 discussed above with reference to FIG. 1) that is coupled to the device lifecycle management engine 204 and/or the sub-engines 204a, 204b, and 204c (e.g., via a coupling between the storage system and the processing system), and that includes a device lifecycle management database 206 that is configured to store any of the information utilized by the device lifecycle management engine 204 and/or the sub-engines 204a, 204b, and 204c discussed below. The chassis 202 may also house a plurality of storage devices 208a, 208b, 208c, 208d, and up to 208e, each of which is coupled to the device lifecycle management engine 204 and/or the sub-engines 204a, 204b, and 204c (e.g., via a coupling between the storage devices 208a-208e and the processing system). In some of the specific examples below, the storage devices 208a-208e may be provided by Solid State Drives (SSDs) that are coupled to the device lifecycle management engine 204 via a backplane in the server computing system 200. However, one of skill in the art in possession of the present disclosure will appreciate that other types of storage devices, as well as a variety of other types of devices, may have their lifecycles managed according to the teachings of the present disclosure while remaining within the scope of the present disclosure as well. As such, while a specific server computing system 200 has been illustrated, one of skill in the art in possession of the present disclosure will recognize that server computing systems (or other computing devices operating according to the teachings of the present disclosure in a manner similar to that described below for the server computing system 200) may include a variety of components and/or component configurations for providing conventional server computing system functionality, as well as the functionality discussed below, while remaining within the scope of the present disclosure as well.

Figure 3:
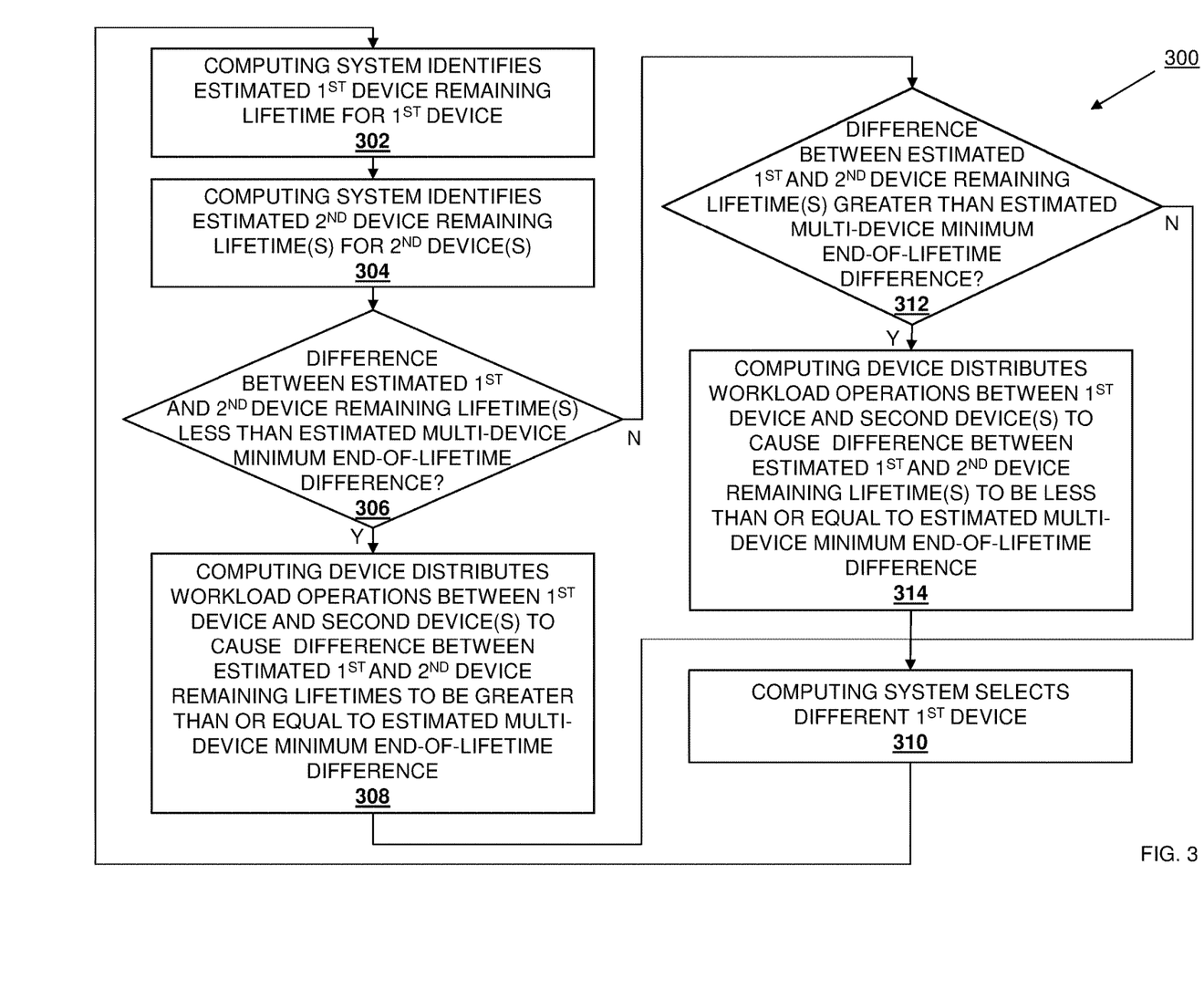
FIG. 3 is a flow chart illustrating an embodiment of a method for managing lifecycles of multiple storage devices.

Referring now to FIG. 3, an embodiment of a method 300 for managing the lifecycle of multiple storage devices is illustrated. As discussed below, the systems and methods of the present disclosure provide for the management of the lifecycle of multiple devices in a computing system such that an estimated end-of-lifetime for any of those devices is an estimated multi-device minimum end-of-lifetime difference from the estimated end-of-lifetime of any of the other devices, which attempts to ensure that no two (or more) of the devices will reach their estimated end-of-lifetime within the same time period. For example, the multi-storage device lifecycle management system of the present disclosure may include a computing system that utilizes a plurality of devices, and a device lifecycle management engine that is provided in the server computing system may operate to identify an estimated device remaining lifetime for the devices, and determine whether a difference between the respective estimated device remaining lifetimes between any two of those devices is less than an estimated multi-device minimum end-of-lifetime difference. In response to determining that the difference between the estimated device remaining lifetimes for any two of those devices is less than the estimated multi-device minimum end-of-lifetime difference, the device lifecycle management engine may operate to distribute workload operations between those devices in order to cause the difference between the estimated device remaining lifetimes of any two of those devices to be greater than or equal to the estimated multi-device minimum end-of-lifetime difference. As will be appreciated by one of skill in the art in possession of the present disclosure, the performance of the operations by the computing system above on the plurality of devices operates to adjust the estimated device remaining lifetime for each of those devices such that it is separated from the estimated device remaining lifetime for the other devices by the estimated multi-device minimum end-of-lifetime difference, thus enabling any estimated end-of-lifetime event for any device (e.g., a device failure) to be managed (e.g., by replacing a failed device) before the estimated end-of-lifetime event for any other device.

Figure 4A:
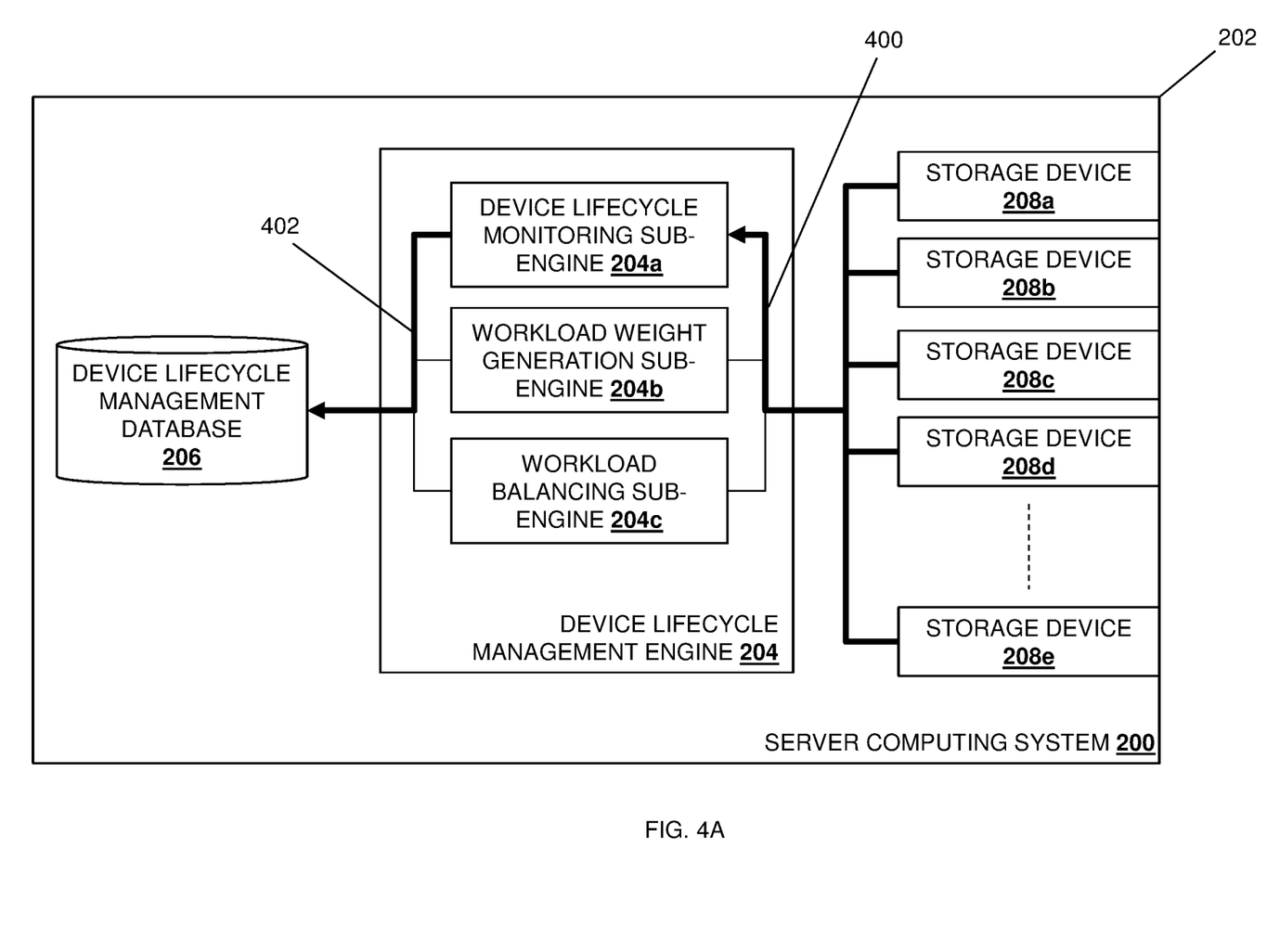
FIG. 4A is a schematic view illustrating an embodiment of the operation of the server computing system of FIG. 2 during the method of FIG. 3.

In an embodiment, at or prior to the method 300, the device lifecycle management engine 204 may operate to receive estimated device remaining lifetimes for any or all of the storage devices 208a-208e. For example, FIG. 4A illustrates each of the storage devices 208a-208e performing estimated device remaining lifetime transmission operations 400 in order to provide respective estimated device remaining lifetimes to the device lifecycle monitoring sub-engine 204a in the device lifecycle management engine 204. As also illustrated in FIG. 4A, upon receiving the estimated device remaining lifetimes for any or all of the storage devices 208a-208e, the device lifecycle monitoring sub-engine 204a in the device lifecycle management engine 204 may operate to perform estimated device remaining lifetime storage operations 402 to store those estimated device remaining lifetime(s) in the device lifecycle management database 206. However, while the method 300 is described as including the device lifecycle monitoring sub-engine 204a in the device lifecycle management engine 204 receiving the estimated device remaining lifetimes for any or all of the storage devices 208a-208e and storing those estimated device remaining lifetimes in the device lifecycle management database 206 for later retrieval by the workload weight generation sub-engine 204b in the device lifecycle management engine 204 (discussed below), one of skill in the art in possession of the present disclosure will appreciate that the device lifecycle monitoring sub-engine 204a may retrieve and provide estimated device remaining lifetimes directly to the workload weight generation sub-engine 204b while remaining within the scope of the present disclosure as well.

In a specific example, each of the storage devices 208a-208e may be provided by SSDs that include a Self-Monitoring, Analysis and Reporting Technology (S.M.A.R.T.) monitoring subsystem that is configured to detect and report various indictors of SSD reliability in order to, for example, allow for the anticipation of imminent hardware failures in the SSD. As such, each of the storage devices 208a-208e may be configured to track and report (e.g., in response to a query from the device lifecycle management engine 204 provided by an operating system engine, on a predetermined schedule, etc.) a "percentage used" for that SSD that provides the estimated device remaining lifetime for that SSD.

As will be appreciated by one of skill in the art in possession of the present disclosure, the "percentage used" for an SSD may include an SSD vendor-specific estimate of the percentage of lifetime of the SSD that has been used, which may be based on the actual usage of the SSD and an SSD manufacturer's prediction of the lifetime of the SSD. In a specific embodiment, the actual usage of the SSD may be tracked based on program/erase cycles performed using the SSD, and one of skill in the art in possession of the present disclosure will appreciate that current conventional Triple Level Cell (TLC) NAND-flash-based SSDs have a predicted lifetime of approximately 7,000 program-erase cycles. However, while a specific usage and predicted SSD lifetime metric is described, one of skill in the art in possession of the present disclosure will appreciate that the usage and predicted lifetime of storage devices and/or other devices may be tracked based on other metrics that will fall within the scope of the present disclosure as well.

As such, in some embodiments, a value of "100" for the "percentage used" for an SSD may indicate that 100% the estimated device remaining lifetime has been consumed, but may not indicate an SSD failure for its associated SSD. For example, the value of the estimated device remaining lifetime for an SSD may be allowed to exceed "100" (e.g., with percentages greater than 254% represented by "255" in order to accommodate reporting techniques). Thus, while some embodiments discussed below provide for the notification to replace an SSD that has reached 100% of its "percentage used" value, one of skill in the art in possession of the present disclosure will recognize that SSDs may be allowed to exceed 100% of their "percentage used" value while remaining within the scope of the present disclosure as well. In some embodiments, the "percentage used" for an SSD may be updated once per "power-on" hour for each SSD (i.e., when a controller in the SSD is not in a sleep state.) However, updating the estimated device remaining lifetime for the storage devices 208a-208e (or other devices) on other schedules (e.g., upon startup, daily, etc.) will fall within the scope of the present disclosure as well.

Figure 4B:
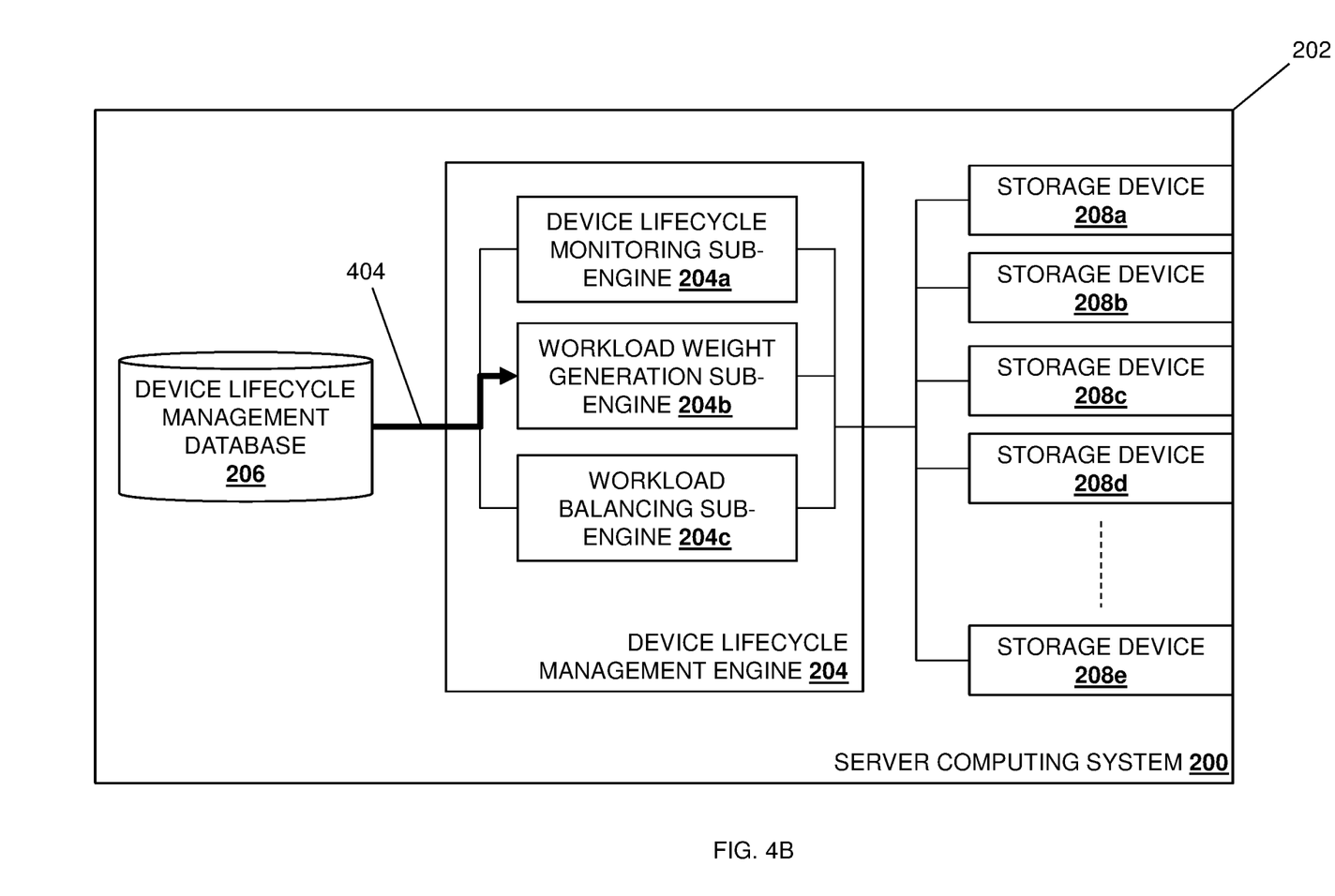
FIG. 4B is a schematic view illustrating an embodiment of the operation of the server computing system of FIG. 2 during the method of FIG. 3.

The method 300 may begin at block 302 where a computing system identifies an estimated first device remaining lifetime for a first device. In this embodiment of a first iteration of the method 300, at block 302, the device lifecycle management engine 204 may operate to select the storage device 208a as the first device for identification of its estimated device remaining lifetime. For example, as illustrated in FIG. 4B, the workload weight generation sub-engine 204b in the device lifecycle management engine 204 may operate to perform estimated device remaining lifetime retrieval operations 404 to retrieve the estimated device remaining lifetime for the storage device 208a that was stored in the device lifecycle management database 206 in order to identify the estimated device remaining lifetime for the storage device 208a. However, as discussed above, while the estimated device remaining lifetime for the storage device 208a is discussed as being retrieved from the device lifecycle management database 206, the device lifecycle monitoring sub-engine 204a may retrieve and provide estimated device remaining lifetimes directly to the workload weight generation sub-engine 204b at block 302 while remaining within the scope of the present disclosure as well.

The method 300 then proceeds to block 304 where the computing system identifies an estimated second device remaining lifetime(s) for second device(s). In this embodiment of the first iteration of the method 300, at block 304 the device lifecycle management engine 204 may identify estimated device remaining lifetimes for the storage devices 208b-208e. Similarly as discussed above and as illustrated in FIG. 4B, the workload weight generation sub-engine 204b in the device lifecycle management engine 204 may operate to perform estimated device remaining lifetime retrieval operations 404 to retrieve the estimated device remaining lifetimes for the storage devices 208b-208e that were stored in the device lifecycle management database 206 in order to identify the estimated device remaining lifetimes for the storage devices 208b-208e. However, as discussed above, while the estimated device remaining lifetimes for the storage devices 208b-208e are discussed as being retrieved from the device lifecycle management database 206, the device lifecycle monitoring sub-engine 204a may retrieve and provide estimated device remaining lifetimes directly to the workload weight generation sub-engine 204b at block 304 while remaining within the scope of the present disclosure as well.

The method 300 then proceeds to decision block 306 where it is determined whether a difference between the estimated first device remaining lifetime and the estimated second device remaining lifetime(s) is less than an estimated multi-device minimum end-of-lifetime difference. In an embodiment, at decision block 306 and in this first iteration of the method 300, the device lifecycle management engine 204 may compare the difference between the estimated device remaining lifetime for the storage device 208a and each of the estimated device remaining lifetimes for the storage devices 208b-208e, and determine whether that difference is less than an estimated multi-device minimum end-of-lifetime difference. For example, at decision block 306, the workload weight generation sub-engine 204b in the device lifecycle management engine 204 may be programmed with (or may access via the device lifecycle management database 206) an estimated multi-device minimum end-of-lifetime difference that has been defined to provide a minimum amount of time that ensures that any particular device utilized by a computing system may be replaced before another device utilized by that computing device becomes unavailable.

In a specific example, it may be determined that a minimum servicing time period required for a failed storage device (e.g., a time period to perform identification and replacement operations for a failed storage device) and a minimum data rebuilding time period required for a replacement storage device (i.e., a storage device that replaces that failed storage device) require a minimum time period of 10 days in order to identify, replace, and rebuild data on any particular storage device 208a-208e that fails. As will be appreciated by one of skill in the art in possession of the present disclosure, in some embodiments the estimated multi-device minimum end-of-lifetime difference may provide time period range (e.g., 10-12 days using the example above) that ensures that any particular storage device 208a-208e utilized by the server computing system 200 that fails may be replaced, while providing an upper limit on the amount of time between the estimated end-of-lifetime between any two of the storage devices 208a-208e.

As such, at decision block 306, the workload weight generation sub-engine 204b in the device lifecycle management engine 204 may compare the difference between the estimated device remaining lifetime for the storage device 208a and the estimated device remaining lifetimes for each of the storage devices 208b-208e and determine whether that difference is less than the estimated multi-device minimum end-of-lifetime difference. Continuing with the examples provided above, and as will be appreciated by one of skill in the art in possession of the present disclosure, a difference between the "percentage used" for the storage device 208a and each of the storage devices 208b-208e may be compared to a "percentage difference" provided by the estimated multi-device minimum end-of-lifetime difference, with that "percentage difference" translating to a minimum amount of time between the end-of-lifetime of the storage device 208a (e.g., the 100% estimated device remaining lifetime for the storage device 208a) and the end-of-lifetime of each of the storage devices 208b-208e (e.g., the 100% estimated device remaining lifetimes for the storage devices 208b-208e).

To provide another specific example, a 10% "percentage difference" between the end-of-lifetimes of the storage device 208a and each of the storage devices 208b-208e may have been determined to provide the minimum time period of 10 days that ensures that the "older" storage device utilized by the server computing system 200 may be replaced before the "younger" storage device utilized by the server computing device 200 fails. As such, in this embodiment of block 306, the workload weight generation sub-engine 204b in the device lifecycle management engine 204 may compare the difference between the estimated device remaining lifetime for the storage device 208a and the estimated device remaining lifetime for each of the storage devices 208b-208e and determine whether that difference is less than 10%. However, while specific estimated multi-device minimum end-of-lifetime differences and/or techniques for determining estimated multi-device minimum end-of-lifetime differences have been described, one of skill in the art in possession of the present disclosure will appreciate that the estimated multi-device minimum end-of-lifetime difference of the present disclosure may be defined based on any of a variety of factors that will fall within the scope of the present disclosure as well.

If, at decision block 306, it is determined that the difference between the estimated first device remaining lifetime and the estimated second device remaining lifetime(s) is less than an estimated multi-device minimum end-of-lifetime difference, the method 300 proceeds to block 308 where the computing device distributes workload operations between the first device and the second devices in order to cause the difference between the estimated first device remaining lifetime and the estimated second device remaining lifetimes to be greater than or equal to the estimated multi-device minimum end-of-lifetime difference. In an embodiment, at block 308, the device lifecycle management engine 204 may operate to adjust workload weights for any of the storage device 208a and the storage devices 208b-208e based on the estimated device remaining lifetime of the storage device 208a differing from the estimated device remaining lifetime(s) of the storage device(s) 208b-208e by less than the estimated multi-device minimum end-of-lifetime difference. As discussed in further detail below, the workload weights adjusted at block 308 are configured to define how workloads are relatively allocated to the storage devices 208a-208e, and thus an increase in a workload weight for a storage device may be configured to cause that storage device to experience more program/erase cycles, while a decrease in a workload weight for a storage device may be configured to cause that storage device to experience fewer program/erase cycles. However, while an example of workload weights related to program/erase cycles is described, one of skill in the art in possession of the present disclosure will recognize how workload weights may correspond to a variety of device usage factors while remaining within the scope of the present disclosure as well.

Figure 4C:
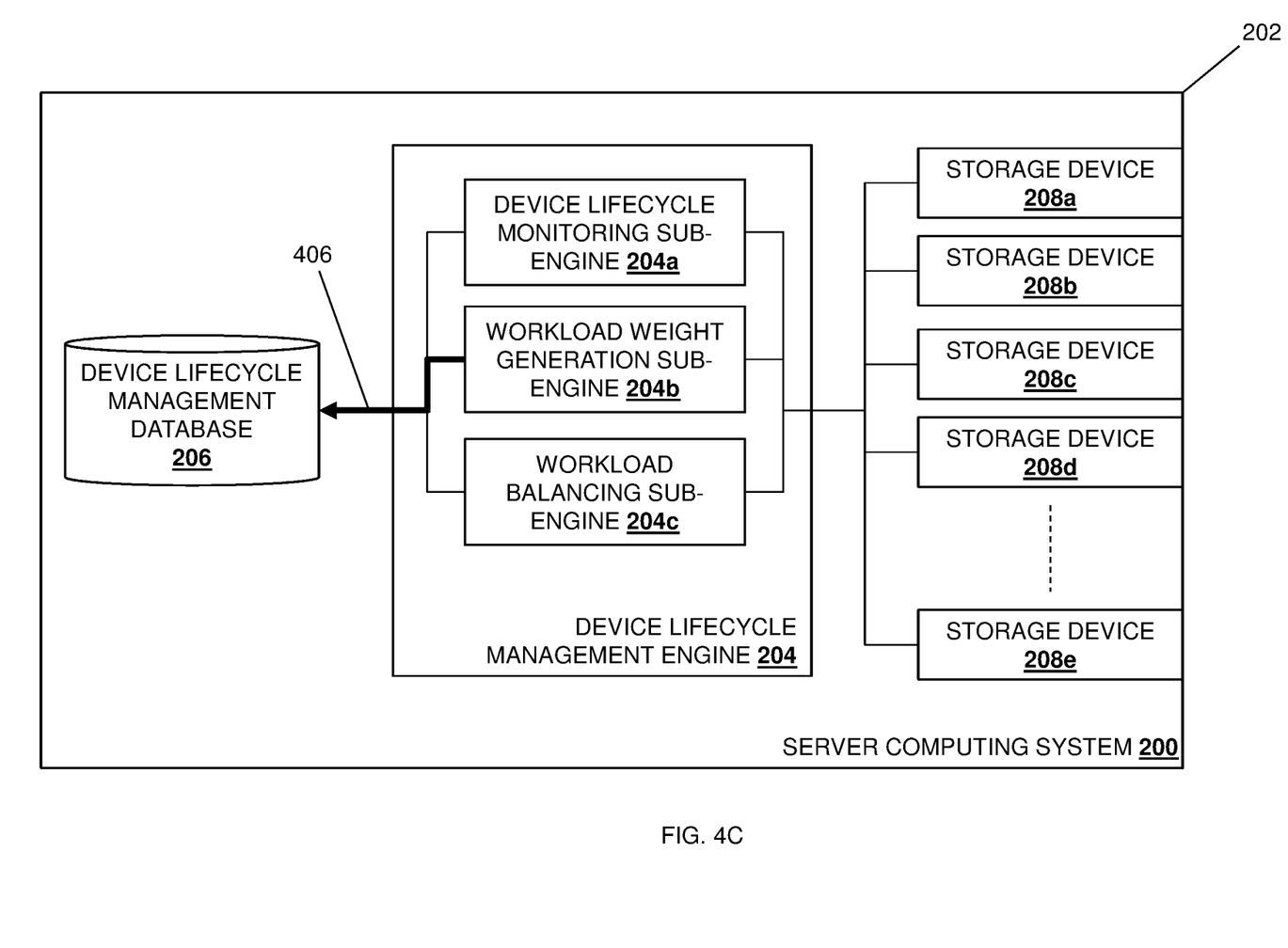
FIG. 4C is a schematic view illustrating an embodiment of the operation of the server computing system of FIG. 2 during the method of FIG. 3.

With reference to FIG. 4C, an embodiment of block 308 is illustrated in which the workload weight generation sub-engine 204b in the device lifecycle management engine 204 performs workload weight adjustment operations 406 in order to modify workload weights for any of the storage devices 208a-208e. However, while the method 300 is described as including the workload weight generation sub-engine 204b in the device lifecycle management engine 204 adjusting workload weights for the storage device(s) 206a-206e that are stored in the device lifecycle management database 206 for later retrieval by the workload balancing sub-engine 204c in the device lifecycle management engine 204 (discussed below), one of skill in the art in possession of the present disclosure will appreciate that the workload weight generation sub-engine 204b may provide adjusted workload weights directly to the workload balancing sub-engine 204c while remaining within the scope of the present disclosure as well.

Using an example of the storage devices 208a and 208b and the estimated multi-device minimum end-of-lifetime difference of 10% discussed above, the storage device 208a may have been identified as having an estimated device remaining lifetime of 75% at block 302, and the storage device 208b may have been identified as having an estimated device remaining lifetime of 69% at block 302. As such, at decision block 304, the difference between the estimated device remaining lifetimes for the storage devices 208a and 208b (e.g., 6% in this example) will be determined to be less than the estimated multi-device minimum end-of-lifetime difference (10%), and in some embodiments of block 308 the device lifecycle management engine 204 may operate to increase a workload weight for the storage device 208a, decrease a workload weight for the storage device 208b, and/or combinations thereof. However, while this example discusses increasing the workload weight for the storage device with a higher current usage (e.g., the storage device 208a) and/or reducing the workload weight for the storage device with a lower current usage (e.g., the storage device 208b), one of skill in the art in possession of the present disclosure will appreciate that the workload weight for the storage device with the higher current usage may be decreased and/or the workload weight for the storage device with the lower current usage may be increased while remaining within the scope of the present disclosure as well.

In some embodiments, the workload weights for the storage devices 208a-208e may be normalized such that the sum of those workload weights equals 1, and as workload weights are adjusted for any particular storage device, that workload weight sum may be maintained. For example, prior to the adjustment of a workload weight for the storage device 208a the sum of the workload weights for the storage devices 208a-208e may equal 1, and subsequent to the adjustment of the workload weight for the storage device 208a the sum of the workload weights for the storage devices 208a-208e may no longer equal 1 (e.g., the sum of the workload weights for the storage devices 208a-208e may equal 1.05 if the workload weight for the storage device 208a was increased, the sum of the workload weights for the storage devices 208a-208e may equal 0.95 if the workload weight for the storage device 208a was decreased, etc.) As such, at block 308, the workload weight generation sub-engine 204b may generate a workload weight adjustment coefficient in response to modifying a workload weight for the storage device 208a (e.g., with that coefficient equaling [1/(sum of workload weights)]), and may then apply that coefficient to the workload weights for each of the storage devices 208b-208e to ensure that the sum of the workload weights for the storage devices 208a-208e again equals 1.

Continuing with the examples of the storage devices 208a and 208b, at block 308 the device lifecycle management engine 204 may then distribute workloads to the storage device 208a and/or the storage device 208b in order to cause the difference between the estimated device remaining lifetime of the storage device 208a and the estimated device remaining lifetime of the storage device 208b to be greater than or equal to the estimated multi-device minimum end-of-lifetime difference. For example, with reference to FIG. 4D, the workload balancing sub-engine 204c in the device lifecycle management engine 204 may perform workload weight retrieval operations 408 in order to retrieve the workload weight(s) for the storage device(s) 208a and 208b that are stored in the device lifecycle management database 206. However, as discussed above, while the workload weights for the storage device(s) 208a and 208b are discussed as being retrieved from the device lifecycle management database 206, the workload weight generation sub-engine 204b may provide the workload weight(s) for the storage device(s) 208a and 208b directly to the workload balancing sub-engine 204c at block 308 while remaining within the scope of the present disclosure as well.

Figure 4D:
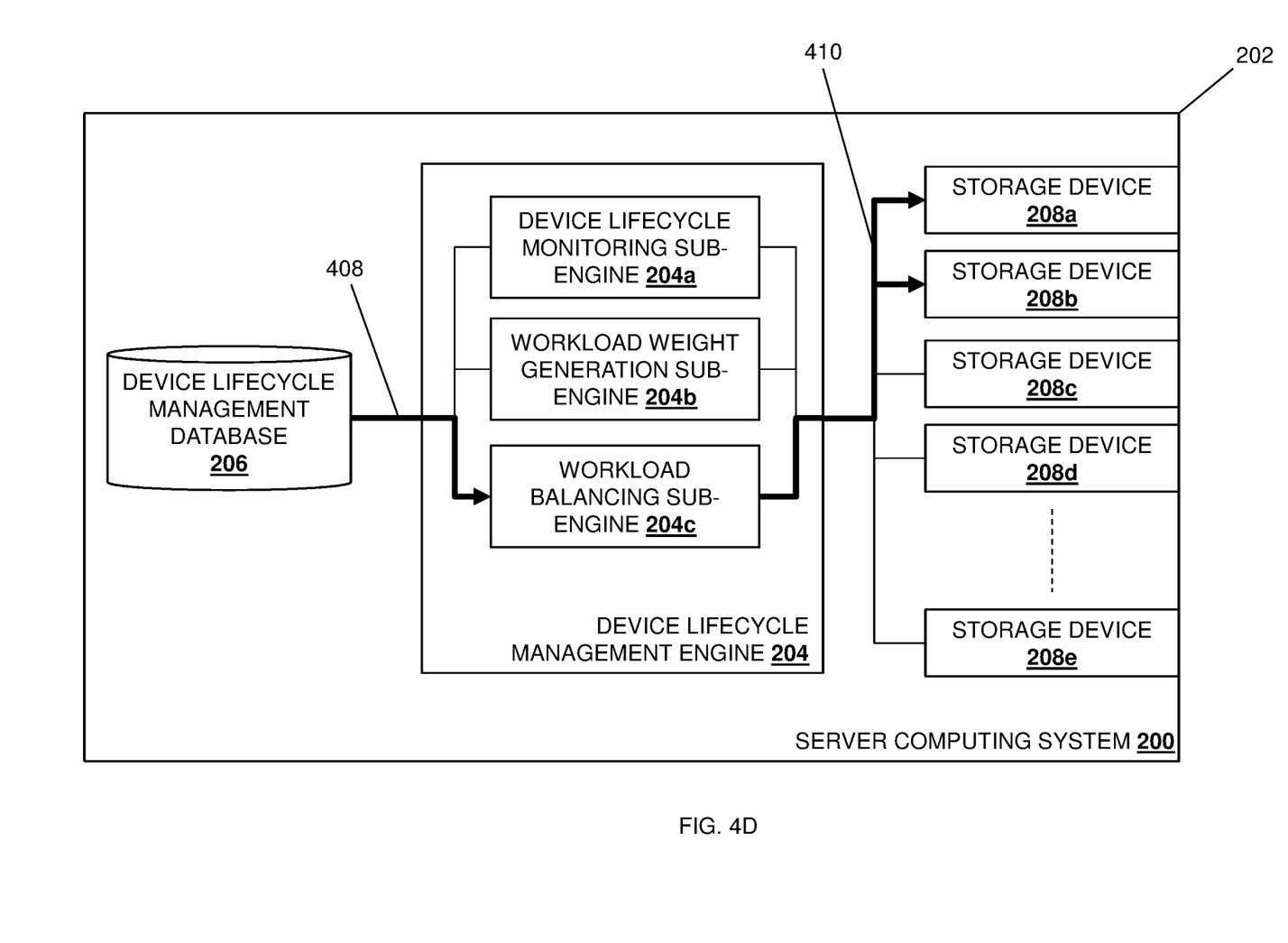
FIG. 4D is a schematic view illustrating an embodiment of the operation of the server computing system of FIG. 2 during the method of FIG. 3.

With continued reference to FIG. 4D, the workload balancing sub-engine 204c in the device lifecycle management engine 204 may then perform workload distribution operations 410 to distribute workload(s) to the storage device(s)

208*a* and/or 208*b* based on the workload weight(s) for the storage device(s) 208*a* and/or 208*b*. Continuing with the specific example provided above, the workload weights for the storage devices 208*a* and 208*b* may result in workload distribution operations 410 that distribute workloads to the storage device(s) 208*a* and 208*b* that are configured to cause the estimated device remaining lifetime of the storage device 208*a* to increase (e.g., from the 75% identified at block 302) and/or the estimated device remaining lifetime of the storage device 208*b* to decrease (e.g., from the 69% identified at block 302) until the difference between the two is greater than the estimated multi-device minimum end-of-lifetime difference of 10%. However, as discussed above, while this example discusses increasing the distribution of workload operations for the storage device with a higher current usage (e.g., the storage device 208*a*) and/or reducing the distribution of workload operations for the storage device with a lower current usage (e.g., the storage device 208*b*), one of skill in the art in possession of the present disclosure will appreciate that the distribution of workload operations for the storage device with the higher current usage may be decreased and/or the distribution of workload operations for the storage device with the lower current usage may be increased while remaining within the scope of the present disclosure as well.

Figure 4E:
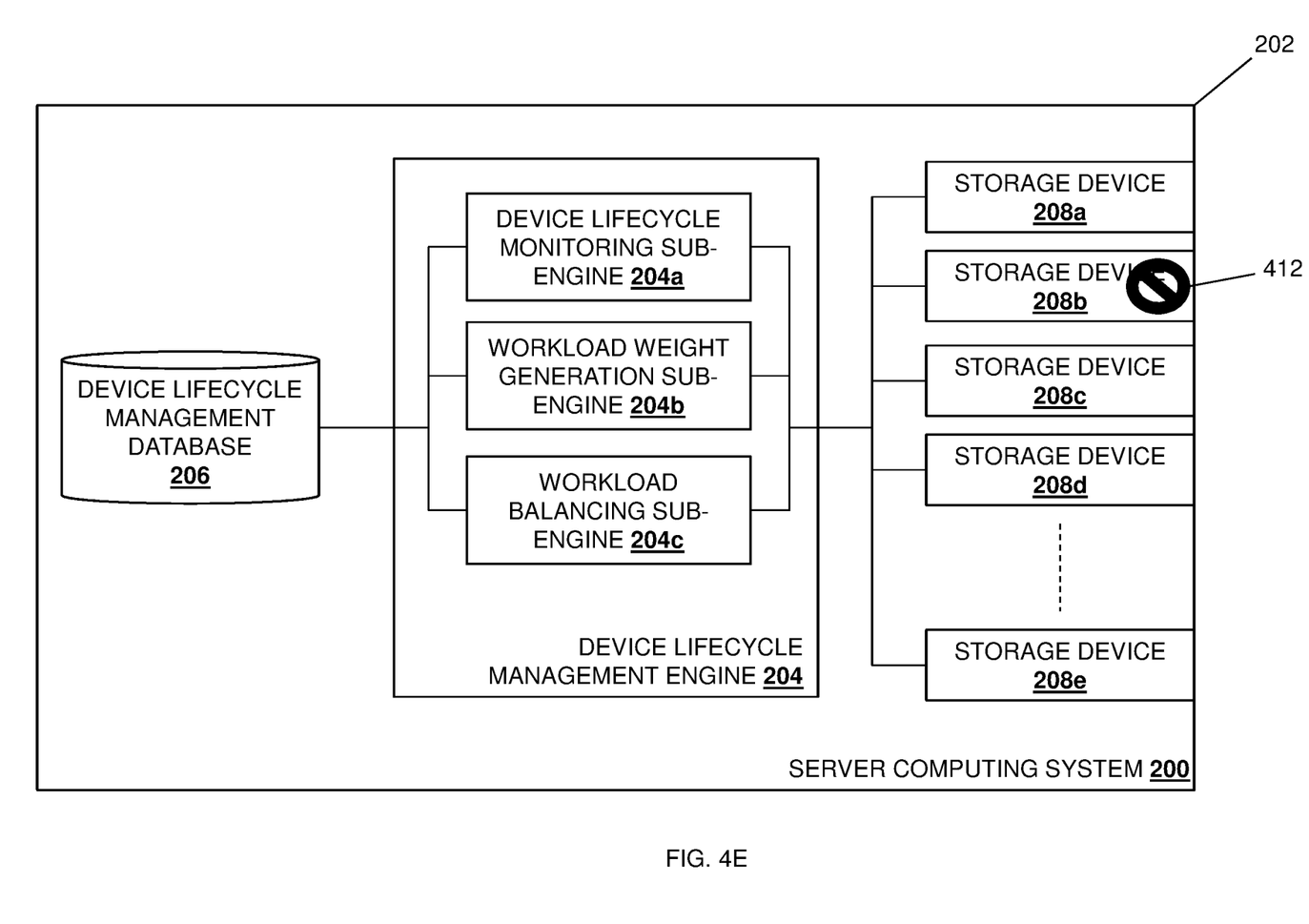
FIG. 4E is a schematic view illustrating an embodiment of the operation of the server computing system of FIG. 2 during the method of FIG. 3.

In some embodiments, the workload weight for a device may be configured to cause that device to become "non-active" (e.g., the lowest workload weight available may result in its corresponding device not being used). For example, FIG. 4E illustrates how the storage device 208*b* may be made "non-active" (as indicated by element 412) based on its workload weight, which one of skill in the art in possession of the present disclosure will appreciate may cause the difference between the estimated device remaining lifetime of the storage device 208*a* and the estimated device remaining lifetime of the storage device 208*b* to increase relatively quickly until it is greater than the estimated multi-device minimum end-of-lifetime difference of 10% discussed in the example above. In some embodiments, the workload balancing sub-engine 204*c* in the device lifecycle management engine 204 may be configured to ensure that the remaining storage devices are capable of handling current workloads before making any of those storage devices "non-active", and may be configured to "re-activate" any of those storage devices (i.e., in order to allow those storage devices to handle current workloads) in the event it determines that the current workloads are within a threshold of what the currently active storage devices can handle.

Thus, one of skill in the art in possession of the present disclosure will appreciate how the operations discussed above as being performed for the storage devices 208*a* and 208*b* may also be performed to ensure that the estimated device remaining lifetimes for the storage device 208*a* and each of the storage devices 208*c*-208*e* is greater than the estimated multi-device minimum end-of-lifetime difference, thus ensuring that an estimated end-of-lifetime for the storage device 208*a* will occur minimum time period of 10 days before (or after) the estimated end-of-lifetime of any of the storage devices 208*b*-208*e*, which one of skill in the art in possession of the present disclosure will recognize provides some assurances that the storage device 208*a* will not fail within 10 days of any of the other storage devices 208*b*-208*e* based on their estimated end-of-lifetime.

The method 300 then proceeds to block 310 where the computing system selects a different first device. In an embodiment, at block 310, the device lifecycle management engine 204 may operate to select the storage device 208*b* as the "first device" discussed in the method 300, and the method 300 then returns to block 302. As such, the operations discussed above as being performed for the storage device 208*a* (i.e., the "first device") in the first iteration of the method 300) may then be performed for the storage device 208*b* in the second iteration of the method 300, which one of skill in the art in possession of the present disclosure will recognize operates to ensure that the estimated device remaining lifetimes for the storage device 208*b* and each of the storage devices 208*a* and 208*c*-208*e* is greater than the estimated multi-device minimum end-of-lifetime difference, thus ensuring that an estimated end-of-lifetime for the storage device 208*b* will occur minimum time period of 10 days before (or after) the estimated end-of-lifetime of any of the storage devices 208*a* and 208*c*-208*e*, and providing some assurances that the storage device 208*b* will not fail within 10 days of any of the other storage devices 208*a* and 208*c*-208*e*. Furthermore, similar operations may be performed for each of the storage devices 208*c*, 208*d*, and up to 208*e*, after which each storage device 208*a*-208*e* will have an estimated end-of-lifetime that is separated by at least 10 days from each of the other storage devices. In some embodiments (e.g. embodiments in which relatively larger differences between estimated end-of-lifetimes of different storage devices are not an issue), the method 300 may then end.

However, in some embodiments, if at decision block 306 it is determined that that the difference between the estimated first device remaining lifetime and the estimated second device remaining lifetime(s) is not less than an estimated multi-device minimum end-of-lifetime difference, the method 300 proceeds to decision block 312 where it is determined whether the difference between the estimated first device remaining lifetime and the estimated second device remaining lifetime(s) is greater than the estimated multi-device minimum end-of-lifetime difference. In this embodiment that continues the first iteration of the method 300 discussed above, at decision block 312, the device lifecycle management engine 204 may compare the difference between the estimated device remaining lifetime for the storage device 208*a* and each of the estimated device remaining lifetimes for the storage devices 208*b*-208*e* is greater than the estimated multi-device minimum end-of-lifetime difference. As discussed above, the workload weight generation sub-engine 204*b* in the device lifecycle management engine 204 may be programmed with (or may access via the device lifecycle management database 206) the estimated multi-device minimum end-of-lifetime difference and, at decision block 312, the workload weight generation sub-engine 204*b* in the device lifecycle management engine 204 may compare the difference between the estimated device remaining lifetime for the storage device 208*a* and the estimated device remaining lifetimes for each of the storage devices 208*b*-208*e* and determine whether that difference is greater than the estimated multi-device minimum end-of-lifetime difference.

Continuing with the specific example provided above, the estimated multi-device minimum end-of-lifetime difference may provide time period range (e.g., 10-12 days using the example above) that is satisfied by a 12% "percentage difference" between the end-of-lifetimes of the storage devices that has been determined to provide a maximum desired time period of 12 days between the end-of-lifetimes of any two storage devices. As such, in this embodiment of block 312, the workload weight generation sub-engine 204*b* in the device lifecycle management engine 204 may compare the difference between the estimated device remaining lifetime for the storage device 208a and the estimated device remaining lifetime for each of the storage devices 208b-208e and determine whether that difference is greater than 12%. However, while specific estimated multi-device minimum end-of-lifetime differences and/or techniques for determining estimated multi-device minimum end-of-lifetime differences have been described, one of skill in the art in possession of the present disclosure will appreciate that the estimated multi-device minimum end-of-lifetime difference of the present disclosure may be defined based on any of a variety of factors that will fall within the scope of the present disclosure as well.

If, at decision block 312, it is determined that the difference between the estimated first device remaining lifetime and the estimated second device remaining lifetime(s) is greater than an estimated multi-device minimum end-of-lifetime difference, the method 300 proceeds to block 314 where the computing device distributes workload operations between the first device and the second device(s) in order to cause the difference between the estimated first and second device remaining lifetimes to be less than or equal to the estimated multi-device minimum end-of-lifetime difference. In an embodiment, at block 314, the device lifecycle management engine 204 may operate to adjust workload weights for any of the storage device 208a and the storage devices 208b-208e based on the estimated device remaining lifetime of the storage device 208a differing from the estimated device remaining lifetime(s) of the storage device(s) 208b-208e by more than the estimated multi-device minimum end-of-lifetime difference. Similarly as discussed above, the workload weights adjusted at block 314 are configured to define how workloads are relatively allocated to the storage devices 208a-208e, and thus an increase in a workload weight for a storages device may be configured to cause that storage device to experience more program/erase cycles, while a decrease in a workload weight for a storage device may be configured to cause the storage device to experience fewer program/erase cycles. However, while an example of workload weights related to program/erase cycles is described, one of skill in the art in possession of the present disclosure will recognize how workload weights may correspond to a variety of device usage factors while remaining within the scope of the present disclosure as well.

With reference again to FIG. 4C, an embodiment of block 314 is illustrated in which the workload weight generation sub-engine 204b in the device lifecycle management engine 204 performs workload weight adjustment operations 406 in order to modify workload weights for any of the storage devices 208a-208e. However, while the method 300 is described as including the workload weight generation sub-engine 204b in the device lifecycle management engine 204 adjusting workload weights for the storage device(s) 206a-206e stored in the device lifecycle management database 206 for later retrieval by the workload balancing sub-engine 204c in the device lifecycle management engine 204 (discussed above), one of skill in the art in possession of the present disclosure will appreciate that the workload weight generation sub-engine 204b may provide adjusted workload weights directly to the workload balancing sub-engine 204c while remaining within the scope of the present disclosure as well.

Using an example of the storage devices 208a and 208b and the estimated multi-device minimum end-of-lifetime difference of 10-12% discussed above, the storage device 208a may have been identified as having an estimated device remaining lifetime of 82% at block 302, and the storage device 208b may have been identified as having an estimated device remaining lifetime of 64% at block 302. As such, at decision block 304 the difference between the estimated device remaining lifetimes for the storage devices 208a and 208b (e.g., 18% in this example) will be determined to be greater than the estimated multi-device minimum end-of-lifetime difference (e.g., a maximum of 12%), and in some embodiments of block 314 the device lifecycle management engine 204 may operate to decrease a workload weight for the storage device 208a, increase a workload weight for the storage device 208b, and/or combinations thereof. However, while this example discusses decreasing the workload weight for the storage device with a higher current usage (e.g., the storage device 208a) and/or increasing the workload weight for the storage device with a lower current usage (e.g., the storage device 208b), one of skill in the art in possession of the present disclosure will appreciate that the workload weight for the storage device with the higher current usage may be decreased and/or the workload weight for the storage device with the lower current usage may be increased while remaining within the scope of the present disclosure as well.

Similarly as discussed above, in some embodiments, the workload weights for the storage devices 208a-208e may be normalized such that the sum of those workload weights equals 1, and as workload weights are adjusted for any particular storage device, that workload weight sum may be maintained. For example, prior to the adjustment of a workload weight for the storage device 208a the sum of the workload weights for the storage devices 208a-208e may equal 1, and subsequent to the adjustment of the workload weight for the storage device 208a the sum of the workload weights for the storage devices 208a-208e may no longer equal 1 (e.g., the sum of the workload weights for the storage devices 208a-208e may equal 1.05 if the workload weight for the storage device 208a was increased, the sum of the workload weights for the storage devices 208a-208e may equal 0.95 if the workload weight for the storage device 208a was decreased, etc.) As such, at block 314, the workload weight generation sub-engine 204b may generate a workload weight adjustment coefficient in response to modifying a workload weight for the storage device 208a (e.g., with that coefficient equaling [1/(sum of workload weights)]), and may then apply that coefficient to the workload weights for each of the storage devices 208b-208e to ensure that the sum of the workload weights for the storage devices 208a-208e again equals 1.

Continuing with the examples of the storage devices 208a and 208b, at block 308 the device lifecycle management engine 204 may then distribute workloads to the storage device 208a and/or the storage device 208b in order to cause the difference between the estimated device remaining lifetime of the storage device 208a and the estimated device remaining lifetime of the storage device 208b to be less than or equal to the estimated multi-device minimum end-of-lifetime difference. For example, with reference again to FIG. 4D, the workload balancing sub-engine 204c in the device lifecycle management engine 204 may perform workload weight retrieval operations 408 in order to retrieve the workload weight(s) for the storage device(s) 208a and 208b that are stored in the device lifecycle management database 206. However, as discussed above, while the workload weights for the storage device(s) 208a and 208b are discussed as being retrieved from the device lifecycle management database 206, the workload weight generation sub-engine 204b may provide the workload weight(s) for the storage device(s) 208a and 208b directly to the workload balancing sub-engine 204c at block 308 while remaining within the scope of the present disclosure as well.

With reference again to FIG. 4D, the workload balancing sub-engine 204c in the device lifecycle management engine 204 may then perform workload distribution operations 410 to distribute workload(s) to the storage device(s) 208a and 208b based on the workload weight(s) for the storage device(s) 208a and 208b. Continuing with the specific example provided above, the workload weights for the storage devices 208a and 208b may provide for workload distribution operations 410 that distribute workloads to the storage device(s) 208a and 208b that are configured to cause the estimated device remaining lifetime of the storage device 208a to decrease (e.g., from the 82% identified at block 302) and/or the estimated device remaining lifetime of the storage device 208b to increase (e.g., from the 64% identified at block 302) until the difference between the two is less than or equal to the estimated multi-device minimum end-of-lifetime difference of 12%. However, as discussed above, while this example discusses decreasing the distribution of workload operations for the storage device with a higher current usage (e.g., the storage device 208a) and/or increasing the distribution of workload operations for the storage device with a lower current usage (e.g., the storage device 208b), one of skill in the art in possession of the present disclosure will appreciate that the distribution of workload operations for the storage device with the higher current usage may be decreased and/or the distribution of workload operations for the storage device with the lower current usage may be increased while remaining within the scope of the present disclosure as well.

Similarly as discussed above, in some embodiments the workload weight for a device may be configured to cause that device to become "non-active" (e.g., the lowest workload weight available may result in its corresponding device not being used). Similarly as illustrated in FIG. 4E, the storage device 208a in this embodiment may be made "non-active" based on its workload weight, which one of skill in the art in possession of the present disclosure will appreciate may cause the difference between the estimated device remaining lifetime of the storage device 208a and the estimated device remaining lifetime of the storage device 208b to decrease relatively quickly until it is less than or equal to the estimated multi-device minimum end-of-lifetime difference of 12%. Similarly as discussed above, the workload balancing sub-engine 204c in the device lifecycle management engine 204 may be configured to ensure that the remaining storage devices are capable of handling current workloads before making any of those storage devices "non-active", and may be configured to "re-activate" any of those storage devices (i.e., in order to allow those storage devices to handle current workloads) in the event it determines that the current workloads are within a threshold of what the currently active storage devices can handle.

Thus, one of skill in the art in possession of the present disclosure will appreciate how (in some embodiments) the operations discussed above as being performed for the storage devices 208a and 208b may also be performed to ensure that the estimated device remaining lifetimes for the storage device 208a and each of the storage devices 208c-208e is less than or equal to the estimated multi-device minimum end-of-lifetime difference, thus ensuring that an estimated end-of-lifetime for the storage device 208a will occur between 10-12 days before or after the estimated end-of-lifetime of any of the storage devices 208b-208e, which one of skill in the art in possession of the present disclosure will recognize provides some assurances that the storage device 208a will fail within 10-12 days of any of the other storage devices 208b-208e based on their estimated end-of-lifetimes.

The method 300 then proceeds to block 310 where the computing system selects a different first device. Similarly as discussed above, at block 310, the device lifecycle management engine 204 may operate to select the storage device 208b as the "first device" discussed in the method 300, and the method 300 then returns to block 302. As such, the operations discussed above as being performed for the storage device 208a (i.e., the "first device") in the first iteration of the method 300 may then be performed for the storage device 208b in the second iteration of the method 300, which one of skill in the art in possession of the present disclosure will recognize operates to ensure that the estimated device remaining lifetimes for the storage device 208b and each of the storage devices 208a and 208c-208e is within the estimated multi-device minimum end-of-lifetime difference, thus ensuring that an estimated end-of-lifetime for the storage device 208b will occur within 10-12 days before or after the estimated end-of-lifetime of any of the storage devices 208a and 208c-208e, which one of skill in the art in possession of the present disclosure will recognize provides some assurances that the storage device 208b will fail within 10-12 days of any of the other storage devices 208a and 208c-208e based on their estimated end-of-lifetimes. Furthermore, similar operations may be performed for each of the storage devices 208c, 208d, and up to 208e, after which each storage device 208a-208e will have an estimated end-of-lifetime that is separated by 10-12 days from each of the other storage devices. However, while a specific end-of-lifetime separation of 10-12 days is described herein, any end-of-lifecycle separation that ensures a plurality of devices utilized by a computing system reach the end of their estimated lifespans one-by-one and in a manner that allows each of them to be replaced before another device reaches its estimated lifespan will fall within the scope of the present disclosure as well.

As such, in some embodiments, the device lifecycle management engine 204 in the server computing system 200 may be configured to notify a user when any of the storage devices 208a-208e has reached its estimated end-of-lifetime (e.g., a notification to "retire" the storage device that has be used for its estimated lifespan despite the continued functioning of that storage device), which allows a user to institute replacement procedures for that "retiring" storage device with some assurances that none of the other storage devices will reach their respective end-of-lifetimes until the replacement procedures for the "retiring" storage device have been completed. Thus, one of skill in the art in possession of the present disclosure will appreciate that the device lifecycle management engine 204 in the server computing system 200 may be configured to display "end-of-lifetime" notifications for storage devices, generate and transmit automated service requests for "retiring" storage devices, generated and transmit automated replacement storage devices requests, perform automated data backup operations, and/or perform any other operations based on the managed storage device lifecycle functionality described above.

As will be apparent to one of skill in the art in possession of the present disclosure, the lifecycle management of the storage devices 208a-208e discussed above allows erasure coding techniques may be utilized with those storage devices 208a-208e in order to protect data stored on those storage devices 208a-208e without the issues associated with conventional storage systems. As such, data may be broken up into fragments, expanded and encoded with redundant data pieces, and stored across the different storage devices 208a-208e in the server computing device 200, and data that becomes corrupted or otherwise unavailable (e.g., due to a corrupted, failed, or otherwise unavailable storage device) to be rebuilt using information about that data that is stored on the storage devices (e.g., the storage devices that have not failed, become corrupted, or are otherwise unavailable.) Furthermore, in the event of a failure of a storage device in the server computing system 200, that failed storage device may be identified and replaced with a replacement storage device, and the data that was stored on the failed storage device may be rebuilt on the replacement storage device using the erasure coding techniques discussed above. As will be appreciated by one of skill in the art in possession of the present disclosure, the defining of the estimated multi-device minimum end-of-lifetime difference using the time needed to identify and replace failed storage devices and the time needed to rebuild data on a replacement storage device provides assurances that sufficient time will be available to replace any one of the storage devices 208a-208e that fails before any of the other storage devices 208a-208e reaches its estimated end-of-lifetime.

Thus, systems and methods have been described that provide for the management of the lifecycle of multiple SSDs in a server such that an estimated end-of-lifetime for any of those SSDs is an estimated multi-SSD minimum end-of-lifetime difference from the estimated end-of-lifetime of any of the other SSDs, which attempts to ensure that no two (or more) of the SSDs will reach their end-of-lifetime within the same time period. For example, the multi-SSD lifecycle management system of the present disclosure may include a server that utilizes a plurality of SSDs, and an SSD lifecycle management engine that is provided in the server may operate to identify an estimated SSD remaining lifetime for each of the SSDs, and determine whether a difference between the respective estimated SSD remaining lifetimes for any two of those SSDs is less than an estimated multi-SSD minimum end-of-lifetime difference. In response to determining that the difference between the estimated SSD remaining lifetimes for any two of those SSDs is less than the estimated multi-SSD minimum end-of-lifetime difference, the SSD lifecycle management engine may operate to distribute workload operations between those SSDs in order to cause the difference between the estimated SSD remaining lifetimes of those SSDs to be greater than or equal to the estimated multi-SSD minimum end-of-lifetime difference. As will be appreciated by one of skill in the art in possession of the present disclosure, the performance of the operations by the server above on each of the plurality of SSDs operates to adjust the estimated SSD remaining lifetime for each of those SSDs such that it is separated from the estimated SSD remaining lifetime for the other SSDs by the estimated multi-SSD minimum end-of-lifetime difference, thus enabling any end-of-lifetime event for any SSD (e.g., an SSD failure) to be managed (e.g., by replacing a failed SSD) before the end-of-lifetime event for any other SSD.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-storage device lifecycle management system, comprising:
    a server computing system;
    a plurality of storage devices that are included in the server computing system; and
    an operating system engine that is provided in the server computing system, that is coupled to the plurality of storage devices, and that is configured to:
        identify an estimated first storage device remaining lifetime for a first storage device that is included in the plurality of storage devices;
        identify an estimated second storage device remaining lifetime for a second storage device that is included in the plurality of storage devices;
        determine that a first difference, which is measured between the estimated first storage device remaining lifetime and the estimated second storage device remaining lifetime, is less than an estimated multi-storage-device minimum end-of-lifetime difference; and
        in response to determining that the first difference, which is measured between the estimated first storage device remaining lifetime and the estimated second storage device remaining lifetime, is less than the estimated multi-storage-device minimum end-of-lifetime difference:
            adjust workload weights of the first storage device and the second storage device such that the first difference is greater than or equal to the estimated multi-storage-device minimum end-of-lifetime difference,
            wherein adjusting the workload weights of the first storage device and the second storage device includes i) increasing a first storage device workload weight of the first storage device such that program/erase cycles of the first storage device are increased, and ii) decreasing a second storage device workload weight of the second storage device such that program/erase cycles of the second storage device are decreased, and
            wherein a first normalized combined workload weight of the first storage device and the second storage device is maintained before and after increasing the first storage device workload weight and decreasing the second storage device workload weight.

2. The system of claim 1, wherein each of the first storage device and the second storage device are Solid State Drive (SSD) storage devices.

3. The system of claim 1, wherein the estimated multi-storage-device minimum end-of-lifetime difference is 10%.

4. The system of claim 1, wherein the decreasing the second storage device workload weight of the second storage device include providing the second storage device in a non-active state.

5. The system of claim 1, wherein the operating system engine is configured to:
    identify an estimated third storage device remaining lifetime for a third storage device that is included in the plurality of storage devices;
    identify an estimated fourth storage device remaining lifetime for a fourth storage device that is included in the plurality of storage devices;
    determine that a second difference, which is measured between the estimated third storage device remaining lifetime and the estimated fourth storage device remaining lifetime, is greater than an estimated multi-storage-device maximum end-of-lifetime difference; and in response to determining that the second difference, which is measured between the estimated third storage device remaining lifetime and the estimated fourth storage device remaining lifetime, is greater than the estimated multi-storage-device maximum end-of-lifetime difference:

adjusting workload weights of the third storage device and the fourth storage device such that the second difference is less than or equal to the estimated multi storage-device maximum end-of-lifetime difference, wherein adjusting the workload weights of the third storage device and the fourth storage device includes i) decreasing a third storage device workload weight of the third storage device such that program/erase cycles of the third storage device are decreased, and ii) increasing a fourth storage device workload weight of the fourth storage device such that program/erase cycles of the fourth storage device are increased, and wherein a second normalized combined workload weight of the third storage device and the fourth storage device is maintained before and after decreasing the third storage device workload weight and increasing the fourth storage device workload weight.

6. The system of claim 1, wherein the estimated multi-storage-device minimum end-of-lifetime difference defines a predetermined number of days between an end-of-lifetime of any two storage devices.

7. An Information Handling System (IHS), comprising:
a processing system; and
a memory system that is coupled to the processing system and that includes instructions that, when executed by the processing system, cause the processing system to provide a storage device lifecycle management engine that is configured to:
identify an estimated first storage device remaining lifetime for a first storage device;
identify an estimated second storage device remaining lifetime for a second storage device;
determine that a first difference, which is measured between the estimated first storage device remaining lifetime and the estimated second storage device remaining lifetime, is less than an estimated multi-storage-device minimum end-of-lifetime difference; and in response to determining that the first difference, which is measured between the estimated first storage device remaining lifetime and the estimated second storage device remaining lifetime, is less than the estimated multi-storage-device minimum end-of-lifetime difference:

adjust workload weights of the first storage device and the second storage device such that the first difference is greater than or equal to the estimated multi-storage-device minimum end-of-lifetime difference, wherein adjusting the workload weights of the first storage device and the second storage device includes i) increasing a first storage device workload weight of the first storage device such that program/erase cycles of the first storage device are increased, and ii) decreasing a second storage device workload weight of the second storage device such that program/erase cycles of the second storage device are decreased, and wherein a first normalized combined workload weight of the first storage device and the second storage device is maintained before and after increasing the first storage device workload weight and decreasing the second storage device workload weight.

8. The IHS of claim 7, wherein each of the first storage device and the second storage device are Solid State Drive (SSD) storage devices.

9. The IHS of claim 7, wherein the estimated multi-storage-device minimum end-of-lifetime difference is 10%.

10. The IHS of claim 7, wherein the decreasing the second storage device workload weight of the second storage device include providing the second storage device in a non-active state.

11. The IHS of claim 7, wherein the device lifecycle management engine is configured to:
identify an estimated third storage device remaining lifetime for a third storage device;
identify an estimated fourth storage device remaining lifetime for a fourth storage device;
determine that a second difference, which is measured between the estimated third storage device remaining lifetime and the estimated fourth storage device remaining lifetime, is greater than an estimated multi-storage-device maximum end-of-lifetime difference; and in response to determining that the second difference, which is measured between the estimated third storage device remaining lifetime and the estimated fourth storage device remaining lifetime, is greater than the estimated multi-storage-device maximum end-of-lifetime difference:

adjusting workload weights of the third storage device and the fourth storage device such that the second difference is less than or equal to the estimated multi-storage-device maximum end-of-lifetime difference, wherein adjusting the workload weights of the third storage device and the fourth storage device includes i) decreasing a third storage device workload weight of the third storage device such that program/erase cycles of the third storage device are decreased, and ii) increasing a fourth storage device workload weight of the fourth storage device such that program/erase cycles of the fourth storage device are increased, and wherein a second normalized combined workload weight of the third storage device and the fourth storage device is maintained before and after decreasing the third storage device workload weight and increasing the fourth storage device workload weight.

12. The IHS of claim 7, wherein the estimated multi-storage-device minimum end-of-lifetime difference defines a predetermined number of days between an end-of-lifetime of any two storage devices.

13. The IHS of claim 7, wherein the estimated first storage device remaining lifetime is based on first workload operations performed by the first storage device and a first predicted lifespan stored on the first storage device, and wherein the estimated second storage device remaining lifetime is based on second workload operations performed by the second storage device and a second predicted lifespan stored on the second storage device.

14. A method for managing the lifecycle of multiple storage devices, comprising:
- identifying, by a computing system, an estimated first storage device remaining lifetime for a first storage device that is utilized by the computing system;
- identifying, by the computing system, an estimated second storage device remaining lifetime for a second storage device that is utilized by the computing system;
- determining, by the computing system, that a first difference, which is measured between the estimated first storage device remaining lifetime and the estimated second storage device remaining lifetime, is less than an estimated multi-storage-device minimum end-of-lifetime difference; and
- in response to determining that the first difference, which is measured between the estimated first storage device remaining lifetime and the estimated second storage device remaining lifetime, is less than the estimated multi-storage-device minimum end-of-lifetime difference:
  - adjusting workload weights of the first storage device and the second storage device such that the first difference is greater than or equal to the estimated multi-storage-device minimum end-of-lifetime difference,
  - wherein adjusting the workload weights of the first storage device and the second storage device includes i) increasing a first storage device workload weight of the first storage device such that program/erase cycles of the first storage device are increased, and ii) decreasing a second storage device workload weight of the second storage device such that program/erase cycles of the second storage device are decreased, and
  - wherein a first normalized combined workload weight of the first storage device and the second storage device is maintained before and after increasing the first storage device workload weight and decreasing the second storage device workload weight.

15. The method of claim 14, wherein each of the first storage device and the second storage device are Solid State Drive (SSD) storage devices.

16. The method of claim 14, wherein the estimated multi-storage-device minimum end-of-lifetime difference is 10%.

17. The method of claim 14, wherein the decreasing the second storage device workload weight of the second storage device include providing the second storage device in a non-active state.

18. The method of claim 14, further comprising:
- identifying, by the computing system, an estimated third storage device remaining lifetime for a third storage device;
- identifying, by the computing system, an estimated fourth storage device remaining lifetime for a fourth storage device;
- determining, by the computing system, that a second difference, which is measured between the estimated third storage device remaining lifetime and the estimated fourth storage device remaining lifetime, is greater than an estimated multi-storage-device maximum end-of-lifetime difference; and
- in response to determining that the second difference, which is measured between the estimated third storage device remaining lifetime and the estimated fourth storage device remaining lifetime, is greater than the estimated multi-storage-device maximum end-of-lifetime difference:
  - adjusting workload weights of the third storage device and the fourth storage device such that the second difference is less than or equal to the estimated multi-storage-device maximum end-of-lifetime difference,
  - wherein adjusting the workload weights of the third storage device and the fourth storage device includes i) decreasing a third storage device workload weight of the third storage device such that program/erase cycles of the third storage device are decreased, and ii) increasing a fourth storage device workload weight of the fourth storage device such that program/erase cycles of the fourth storage device are increased, and
  - wherein a second normalized combined workload weight of the third storage device and the fourth storage device is maintained before and after decreasing the third storage device workload weight and increasing the fourth storage device workload weight.

19. The method of claim 14, wherein the estimated multi-storage-device minimum end-of-lifetime difference defines a predetermined number of days between an end-of-lifetime of any two storage devices.

20. The method of claim 14, wherein the estimated first storage device remaining lifetime is based on first workload operations performed by the first storage device and a first predicted lifespan stored on the first storage device, and wherein the estimated second storage device remaining lifetime is based on second workload operations performed by the second storage device and a second predicted lifespan stored on the second storage device.

* * * * *